United States Patent
Ede et al.

(10) Patent No.: US 7,390,416 B1
(45) Date of Patent: Jun. 24, 2008

(54) METHOD FOR THE REMOVAL OF METALS, INCLUDING A CO-PRECIPITATION OF MOLYBDENUM, FROM WASTEWATER

(75) Inventors: Kenneth F. Ede, Tulsa, OK (US); Kerry C. Thorson, Claremore, OK (US)

(73) Assignee: American Airlines, Inc., Ft. Worth, TX (US)

( * ) Notice: Subject to any disclaimer, the term of this patent is extended or adjusted under 35 U.S.C. 154(b) by 201 days.

(21) Appl. No.: 11/042,661

(22) Filed: Jan. 25, 2005

Related U.S. Application Data

(60) Provisional application No. 60/539,252, filed on Jan. 26, 2004.

(51) Int. Cl.
C02F 1/56 (2006.01)
C02F 1/62 (2006.01)
C02F 101/20 (2006.01)

(52) U.S. Cl. .................. 210/725; 210/727; 210/912; 210/913

(58) Field of Classification Search ................ 210/725
See application file for complete search history.

(56) References Cited

U.S. PATENT DOCUMENTS

| | | | |
|---|---|---|---|
| 4,219,416 A | 8/1980 | Ramirez et al. | |
| 4,465,593 A * | 8/1984 | Wemhoff | 210/96.1 |
| 4,485,075 A | 11/1984 | Maurel | |
| 4,705,639 A * | 11/1987 | Aldrich | 210/720 |
| 4,802,993 A * | 2/1989 | Katoh | 210/725 |
| 4,814,091 A * | 3/1989 | Napier et al. | 210/665 |
| 5,281,339 A | 1/1994 | Mainwaring et al. | |
| 5,330,658 A * | 7/1994 | Grant et al. | 210/717 |
| 5,401,420 A * | 3/1995 | Siefert et al. | 210/709 |
| 5,720,886 A | 2/1998 | Iwinski | |
| 5,935,448 A | 8/1999 | Miller | |
| 6,274,045 B1 * | 8/2001 | Kreisler | 210/710 |
| 6,454,949 B1 * | 9/2002 | Sesay et al. | 210/709 |
| 6,495,047 B1 | 12/2002 | SenGupta et al. | |
| 6,495,048 B2 | 12/2002 | Stephenson et al. | |
| 6,521,117 B2 | 2/2003 | Kocherginsky et al. | |
| 6,623,642 B2 | 9/2003 | Robertson | |
| 6,896,817 B2 * | 5/2005 | Bowers | 210/716 |
| 6,936,177 B2 * | 8/2005 | Yada et al. | 210/726 |

* cited by examiner

Primary Examiner—Peter A. Hruskoci
(74) Attorney, Agent, or Firm—Haynes and Boone, LLP

(57) ABSTRACT

An improved method to remove metals, including molybdenum, from industrial wastewater, by chemical precipitation of the metals, followed by settling and dewatering of the precipitate.

9 Claims, 1 Drawing Sheet

METHOD FOR THE REMOVAL OF METALS, INCLUDING A CO-PRECIPITATION OF MOLYBDENUM, FROM WASTEWATER

RELATED PROVISIONAL PATENT APPLICATION

This application claims priority to U.S. Provisional Patent Application Ser. No. 60/539,252, filed Jan. 26, 2004, entitled Method For The Removal Of Metals, Including A Co-Precipitation Of Molybdenum, From Wastewater, the entirety of which is hereby incorporated by reference.

BACKGROUND

The removal of molybdenum from industrial wastewater has long posed a difficult and expensive technological challenge. This is a particular issue in sectors such as the service and maintenance of transportation vehicles and conveyances, military hardware and construction equipment, in which lubricants such as molybdenum disulfide are commonly used, particularly on wheel and brake parts, aircraft engines and other aerospace and military applications. The cleaning of such equipment and associated parts/hardware generates an oily wastewater containing molybdenum, along with other metals which may leach from the metal parts surfaces, such as cadmium, chromium, nickel, copper, lead and zinc. One of the most significant challenges exists due to the high solubility of molybdenum disulfide, which does not respond to traditional alkaline precipitation processes.

Before such wastewater can be discharged for disposal, strict federal, state and local environmental requirements must be met. This requires treatment of the wastewater to lower the content of molybdenum and the other metals to stringent discharge limits, often to levels such as less than 1 part per million (ppm).

One of the treatment technologies which has been used for the removal of molybdenum from wastewater is ion exchange. However this method is expensive, as it involves high capital and operating costs. In addition, this method is not effective in the treatment of oily wastewaters such as those identified above. A second method which has been used for molybdenum removal is reverse osmosis, in which the wastewater is passed through a semi-permeable membrane to separate the metals components from the wastewater. However, this method also has high capital and operating costs. In addition, once the reverse osmosis process has been completed, the concentrate (the waste stream containing the removed contaminants) must then be treated and disposed at a significant cost.

The traditional methodology used for the removal of metals from wastewater is the precipitation of the metal ions, typically involving the increase in the pH of the wastewater to facilitate the precipitation. However, this method can be time consuming and inefficient. Certain metals, such as cadmium and chromium, may precipitate out of solution under alkaline conditions, while metals such as molybdenum will not precipitate as easily and will typically remain in solution at levels above environmental regulatory discharge limits.

U.S. Pat. No. 4,219,416 issued to Ramirez et al. discloses an existing method for removing molybdenum and tungsten from mining wastewater. This patent teaches that methods of precipitating or settling out these minerals are inefficient and discloses a method of removing them using gas flotation. A trivalent metal cation is added to the wastewater and its pH is lowered. After an initial treatment of electrolytically driven dissolved air flotation, a flocculating polymer is added and the wastewater is again subjected to dissolved air flotation. This system is costly, inefficient and time consuming.

U.S. Pat. No. 4,485,075 issued to Maurel discloses a method of extracting arsenic in various metals. Lime is added to raise the pH and cause various contaminants to precipitate. Because the process requires evaporation of effluent it is time consuming. Furthermore, it requires stoichiometric determinations and is therefore complicated.

U.S. Pat. No. 5,281,339 issued to Mainwaring et al. discloses a method of removing contaminants by forming a foam, drying it and removing it from the waste water. The foam is formed by adding the sulfates or hydroxides of either iron or aluminum and a strong surfactant to the effluent and mixing it. The foam is then pulled off the wastewater, dried and removed. Gas is applied to the wastewater to induce formation of the foam. It teaches that sedimentation is a slow, undesirable process.

Accordingly, there is a need for an improved method of the treatment of molybdenum-containing wastewater. The present invention provides a method whereby molybdenum, along with other metal ions, is readily precipitated and separated from the wastewater. Through the addition of a metal sulfate, such as alum, to the wastewater, an effective method of precipitation of molybdenum and other metals under acidic conditions is presented. Alum has traditionally not been used in the precipitation of molybdenum and has typically not been effective under acidic conditions. Due to the efficiency of this process, neither reverse osmosis, gas flotation, ion exchange nor any other unit operation is needed.

DETAILED DESCRIPTION

Figure 1:
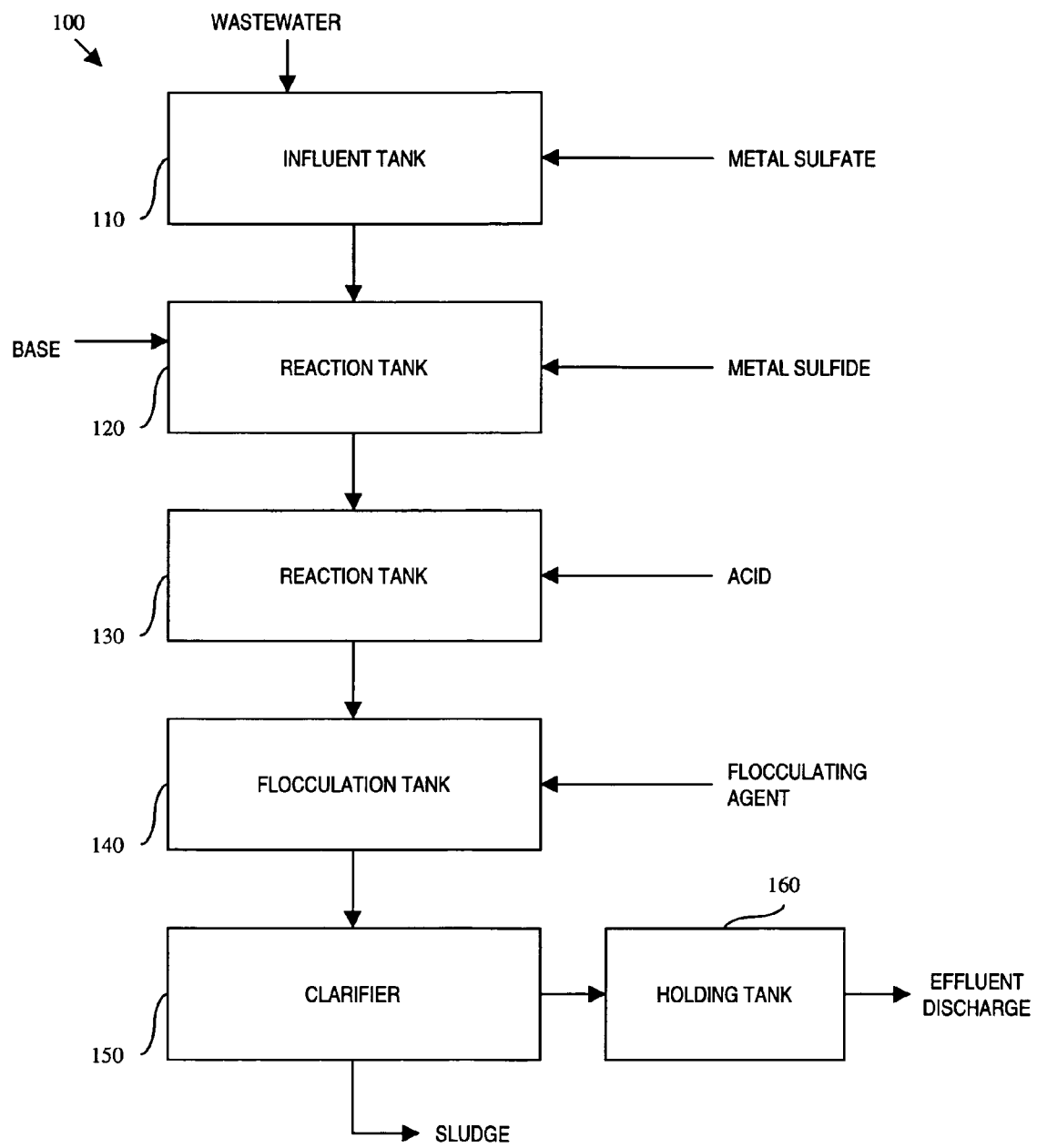
FIG. 1 is a flow chart diagram of one embodiment of the present invention.

It is to be understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The present invention relates to an improved process for the removal of metals, including molybdenum, from industrial wastewater. Molybdenum is often present as molybdenum disulfide, used as a lubricant in machinery and in wheel and brake systems. The water washing of such machinery or wheel and brake systems usually generates a slightly basic wastewater containing molybdenum along with other metals such as cadmium, copper, nickel, chromium, lead and zinc.

Referring to FIG. 1, illustrated is a flow-chart diagram of at least a portion of one embodiment of a method 100 according to aspects of the present invention. The method includes treating wastewater, which can have a pH in the range of 6 to 12, but typically will have a pH in the range of 8 to 10, with a metal sulfate compound, preferably aluminum sulfate (alum), in an Influent Tank 110. Alum is commonly available from commercial suppliers in solutions ranging from concentrations of 17% to 37%, by weight. Based on treatability tests, the methods of the present invention are effective in molybdenum removal when alum is added in a concentration of approximately 0.15% to 1.0%, or 0.15% to 0.35%, by weight of the wastewater. The addition of alum to the wastewater results in lowering of the pH of the wastewater to approximately 3.5 to 6.0, or to 4.0 to 5.5. The alum is mixed with the wastewater until the pH has stabilized. In a batch process, a mixing time of 30 minutes to 2 hours, or about 1 hour, is typically sufficient.

Following the addition of alum, the wastewater is transferred to a first Reaction Tank 120, where the pH of the wastewater is raised through the addition of a suitable hydroxyl providing basic solution. Suitable basic solutions include 50% solutions of sodium hydroxide, potassium hydroxide or magnesium hydroxide. The basic solution is added in a sufficient amount to adjust the pH of the wastewater to about 8.0 to 10.0, or to about 9.0. Following the adjustment of the pH, a suitable metal sulfide complex, such as an iron sulfide complex with sodium dimethyldithiocarbamate as a component, is added to the wastewater at a concentration of about 1% to 2% by weight. The addition of the metal sulfide complex is made so as to limit any excess of the metal sulfide complex remaining in solution since such excess may contribute to the liberation of hydrogen sulfide gas in an acidification step described below. Commercially available sources of this iron sulfide complex include NALMET® 1689 and Mitco Mitfloc® 5381L, but other commercially available forms of metal sulfide complexes can be used. In a batch process, a mixing time of about 10 minutes to 1 hour, or about 15 minutes, following the addition of the metal sulfide complex is generally sufficient.

The wastewater is then transferred to a second Reaction Tank 130 for the addition of an acid to the wastewater, such as phosphoric acid, sulfuric acid or nitric acid. The use of phosphoric acid will result in the formation of a large floc in the flocculation step, as described more fully below. The acid is added to lower the pH of the wastewater to about 3.2 to 3.7, or to about 3.5 to 3.7. As the pH is lowered, a fine pin-floc will begin to form. When nitric acid is used in the lowering of the pH, the resulting floc is slightly red in color, which indicates the presence of molybdenum in the precipitate. The pH should be monitored closely, as lowering the pH below 3.2 may result in the formation of hydrogen sulfide gas. Monitors can be used to measure sulfide concentrations in the ambient air.

Following the addition of acid, the wastewater is transferred to a Flocculation Tank 140 where a flocculating agent is added to the wastewater in a sufficient amount to precipitate the metals. A representative flocculent includes a high molecular weight anionic polymeric flocculent such as Nalco® 7768 at an approximate concentration of about 0.1% to 0.6% by weight of the wastewater. This concentration may vary due to the specific wastewater constituent concentrations. Other commercially available forms of polymer flocculents can be used.

The treated wastewater mixture is then transferred to a Clarifier 150 in which the resulting precipitate sludge is allowed to settle. The sludge is then separated from the supernate. Various techniques can be utilized to effect this separation, such as through the use of an inclined plate clarifier. The sludge is then dewatered by means of a filtration process, such as a plate and frame press, belt filter press or centrifuge. Dewatering by these means provides an efficient separation of the supernate from the sludge, resulting in a low moisture-content sludge for disposal and a clear effluent with reduced metal content.

The effluent is transferred to a Holding Tank 160. The effluent will typically be slightly acidic, and pH adjustment, through the addition of a hydroxyl providing basic solution, may be required in the Holding Tank 160 prior to discharge of the effluent to the environment in accordance with environmental regulatory requirements.

According to the methods of the present invention, an industrial wastewater with a molybdenum content above 100 ppm can be treated to reduce the molybdenum content of the resulting treated wastewater effluent to about less than 1.5 ppm. This equates to a greater than 98% removal efficiency. In addition, the methods of the present invention also reduce the content of other metals present in the wastewater. For instance, the concentrations of cadmium, copper, nickel, chromium, lead and zinc in wastewater are reduced by greater than 98%.

EXAMPLES

The following examples are intended only to illustrate the present invention and should not be construed as imposing limitations upon the claims:

Example 1

Laboratory runs were performed for the treatment of molybdenum-containing wastewater with a metals concentration of 2.77 ppm Mo, 3.80 ppm Cd and 27.5 ppm Cu and a pH of 8.64. A series of treatment runs were performed utilizing the method of the present invention, each utilizing an approximate 500 ml sample of the wastewater. In the first step of each run, 1.5 ml of a 50% alum solution was added to the sample. This addition of alum resulted in the lowering of the pH of the wastewater in all runs from 8.64 to 4.4. Next, a 50% NaOH solution was added to the wastewater, raising the pH to approximately 9.0.

Following addition of the NaOH, 5 ml to 10 ml of an iron sulfide complex was added to the wastewater. A coagulating agent was also added to certain runs, at concentrations up to 10 ml. In this set of laboratory runs, the concentrations of the coagulating agent and iron sulfide complex were varied to observe the effect on metal removal efficiency of the method of the present invention. The coagulating agent used is known commercially as NALMET® 8186. The iron sulfide complex used is known commercially as NALMET® 1689. Phosphoric acid was then added until the pH of the wastewater reached approximately 4.0. Following this adjustment of pH, 1 ml of an anionic polymeric flocculent, known commercially as NALCO® 7768 was added to the wastewater.

The metals precipitated as a sludge, which was then separated from the supernate. The supernate was then analyzed for metals content. Table 1 below summarizes the resulting metals content of the treated supernate, along with the corresponding removal efficiency for each metal, for each of the treatment runs conducted as described in this example. Removal efficiency for this experiment was the percentage reduction in the respective metals content of the supernate effluent in relation to the metals content of the influent wastewater sample treated.

TABLE 1

| Run # | Coagulating Agent (ppm) | Nalmet ® 1689 (ppm) | % Removal Efficiency | | |
|---|---|---|---|---|---|
| | | | Mo | Cd | Cu |
| 1 | 0 | 5 | 88.4% | 98.9% | 99.9% |
| 2 | 0 | 5 | 93.1% | 98.7% | 99.9% |
| 3 | 0 | 10 | 98.2% | 98.9% | 99.9% |
| 4 | 0 | 10 | 98.2% | 98.7% | 99.9% |
| 5 | 5 | 5 | 89.2% | 98.9% | 99.9% |
| 6 | 5 | 5 | 86.3% | 98.7% | 99.9% |

TABLE 1-continued

| Run # | Coagulating Agent (ppm) | Nalmet ® 1689 (ppm) | % Removal Efficiency | | |
|---|---|---|---|---|---|
| | | | Mo | Cd | Cu |
| 7 | 5 | 10 | 96.4% | 98.7% | 99.9% |
| 8 | 5 | 10 | 97.8% | 98.7% | 99.9% |
| 9 | 10 | 5 | 82.3% | 98.2% | 99.9% |
| 10 | 10 | 5 | 84.4% | 98.4% | 99.9% |
| 11 | 10 | 10 | 93.1% | 97.9% | 99.7% |
| 12 | 10 | 10 | 95.3% | 97.9% | 99.8% |

As seen from Table 1, through the use of the method of the present invention, removal efficiencies of at least 97.9% for cadmium and 99.7% for copper were achieved. The removal efficiency for molybdenum ranged from 82.3% to 98.2%. The highest molybdenum removal efficiencies (98.2%) were achieved in those laboratory runs utilizing 10 ml of NAL-MET® 1689 iron sulfide complex.

Example 2

In this example, approximately 725 gallons of molybdenum-containing wastewater was charged to an influent tank with a 4000 gallon capacity in a full scale operation. The molybdenum content of the influent wastewater was 119 ppm. Other metals present in the influent wastewater included copper at 55.8 ppm and cadmium at 2.77 ppm.

According to the method of the present invention, following the charge of the wastewater to the influent tank, alum solution was added to the wastewater in the influent tank, to lower the pH of the wastewater to 4 to 5.5, and mixed for approximately one hour. The wastewater was then transferred to a first reaction tank, where the pH of the solution was raised to approximately 9.0 through the addition of a 50% sodium hydroxide solution.

Following addition of the sodium hydroxide, an iron sulfide complex was added to the wastewater in the first reaction tank at a concentration of 1-2%. Following a mixing period of approximately 15 minutes, the wastewater was transferred to a second reaction tank, where phosphoric acid was added to lower the pH of the wastewater to approximately 3.7. The wastewater was then transferred to a flocculation tank for precipitation of the metals. An anionic polymeric flocculent was added, in a concentration of approximately 0.2%.

After addition of the flocculent, the wastewater was transferred to a clarifier, where the metal-containing precipitate sludge was separated from the supernate liquid. The sludge was dewatered in a plate and frame filter press, and the supernate liquid effluent was transferred to a holding tank for analysis and discharge. Removal efficiencies for copper and cadmium were 98.9% and 92.7%, respectively. The molybdenum concentration of the resulting treated effluent was 1.32 ppm, resulting in a removal efficiency of 98.9%.

The examples demonstrate the effectiveness of the method of the present invention, on both the laboratory and full scale, in the removal of metals from wastewater, particularly the removal of molybdenum. This method provides an improvement over other methods of metal precipitation known in the art.

The foregoing has outlined features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method for treating wastewater, comprising:
    (a) adding a metal sulfate comprising aluminum sulfate or alum to a wastewater containing metals comprising molybdenum and having a pH of from about 6 to 12, whereby the pH of the wastewater is lowered to from about 3.5 to 6.0;
    (b) adding a hydroxyl providing base to the wastewater whereby the pH of the wastewater is raised to from about 8 to 10;
    (c) adding a metal sulfide complex comprising an iron sulfide complex with a component comprising sodium dimethyldithiocarbamate to the wastewater;
    (d) adding an acid to the wastewater whereby the pH of the wastewater is lowered to from about 3.2 to 3.7;
    (e) adding a flocculating agent to the wastewater whereby the metals are precipitated as a precipitate; and
    (f) separating the precipitate from the wastewater.

2. The method of claim 1 wherein the wastewater containing metals further comprises at least one of a metal selected from the group consisting of cadmium, copper, nickel, chromium, lead and zinc.

3. The method of claim 1 wherein the aluminum sulfate or alum is added in the range from 0.15% to 1.0% by weight of the wastewater.

4. The method of claim 1 wherein the aluminum sulfate or alum is added in the range from 0.15% to 0.35% by weight of the wastewater.

5. The method of claim 1 wherein the hydroxyl providing base is selected from the group consisting of sodium hydroxide, potassium hydroxide, and magnesium hydroxide.

6. The method of claim 1 wherein the acid is selected from the group consisting of phosphoric acid, sulfuric acid, and nitric acid.

7. The method of claim 1 wherein the flocculating agent comprises a high molecular weight anionic polymer.

8. The method of claim 1 wherein the precipitate settles by gravity by the use of a clarifier.

9. The method of claim 1 wherein the precipitate is separated from the wastewater by means of dewatering.

\* \* \* \* \*